(12) United States Patent
Kubota et al.

(10) Patent No.: US 11,297,519 B2
(45) Date of Patent: Apr. 5, 2022

(54) CELL MEASUREMENT

(71) Applicant: QUALCOMM Incorporated, San Diego, CA (US)

(72) Inventors: Keiichi Kubota, San Diego, CA (US); Sumeeth Nagaraja, San Diego, CA (US); Tao Luo, San Diego, CA (US); Gavin Bernard Horn, La Jolla, CA (US); Haitong Sun, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 15/395,194

(22) Filed: Dec. 30, 2016

(65) Prior Publication Data
US 2018/0014218 A1    Jan. 11, 2018

Related U.S. Application Data

(60) Provisional application No. 62/358,553, filed on Jul. 5, 2016.

(51) Int. Cl.
| | |
|---|---|
| *H04W 24/10* | (2009.01) |
| *H04W 48/00* | (2009.01) |
| *H04W 36/00* | (2009.01) |
| *H04W 56/00* | (2009.01) |

(52) U.S. Cl.
CPC ....... *H04W 24/10* (2013.01); *H04W 36/0061* (2013.01); *H04W 36/0088* (2013.01); *H04W 48/00* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2009/0129327 A1 | 5/2009 | Horn et al. | |
| 2009/0135784 A1* | 5/2009 | Horn | H04W 36/0055 370/331 |
| 2011/0244870 A1* | 10/2011 | Lee | H04W 52/244 455/444 |
| 2013/0170362 A1* | 7/2013 | Futaki | H04W 24/02 370/241.1 |
| 2014/0092861 A1* | 4/2014 | Gao | H04L 27/2675 370/330 |

(Continued)

FOREIGN PATENT DOCUMENTS

| | | |
|---|---|---|
| CN | 103945498 A | 7/2014 |
| WO | 2013154853 A1 | 10/2013 |

*Primary Examiner* — Jeffrey M Rutkowski
*Assistant Examiner* — Mehedi S Aley
(74) *Attorney, Agent, or Firm* — Patterson+ Sheridan, L.L.P.

(57) ABSTRACT

Certain aspects of the present disclosure provide procedures for new radio (NR) cell measurement. According to certain aspects, a method of wireless communication by a user equipment (UE) is provided. The method generally includes receiving one or more downlink signals from a cell, wherein the cell is of a first cell type that supports a first set of functions or a second cell type that supports a second set of functions, wherein the second set of functions is different than the first set of functions; determining a cell type of the cell based on the one or more downlink signals; and communicating with the cell based on the determination.

22 Claims, 13 Drawing Sheets

(56) References Cited

U.S. PATENT DOCUMENTS

| | | | |
|---|---|---|---|
| 2015/0092768 A1* | 4/2015 | Ng | H04W 48/16 370/350 |
| 2015/0124731 A1* | 5/2015 | Tsuboi | H04W 24/10 370/329 |
| 2015/0195732 A1* | 7/2015 | Ouchi | H04W 48/16 370/252 |
| 2015/0296486 A1* | 10/2015 | Park | H04W 48/00 370/329 |
| 2016/0337101 A1* | 11/2016 | Gao | H04W 24/10 |
| 2016/0373990 A1* | 12/2016 | Lim | H04W 36/30 |
| 2017/0013490 A1* | 1/2017 | Lunttila | H04W 24/10 |
| 2017/0230854 A1* | 8/2017 | Harada | H04W 56/001 |
| 2017/0347328 A1* | 11/2017 | Zhou | H04L 5/0051 |
| 2020/0296693 A1* | 9/2020 | Tang | H04W 36/28 |

* cited by examiner

CELL MEASUREMENT

CROSS-REFERENCE TO RELATED APPLICATION & PRIORITY CLAIM

This application claims benefit of and priority to U.S. Provisional Patent Application Ser. No. 62/358,553, filed Jul. 5, 2016, which is herein incorporated by reference in its entirety for all applicable purposes.

INTRODUCTION

Aspects of the present disclosure related generally to wireless communications systems, and more particularly, cell measurement.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for cell measurement are described herein.

In an aspect, a method for wireless communications is provided. The method may be performed, for example, by a user equipment (UE). The method generally includes receiving one or more downlink signals from a cell, wherein the cell is of a first cell type that supports a first set of functions or a second cell type that supports a second set of functions, and wherein the second set of functions is different than the first set of functions; determining a cell type of the cell based on the one or more downlink signals; and communicating with the cell based on the determination.

In an aspect, a method for wireless communications is provided. The method may be performed, for example, by a base station (BS). The method generally includes identifying a cell type of the BS, wherein the BS comprises a first cell type that supports a first set of functions or a second cell type that supports a second set of functions, and wherein the second set of functions is different than the first set of functions; and transmitting an indication of the cell type to a UE.

In an aspect, a method for wireless communications is provided. The method may be performed, for example, by a wireless node. The method generally includes determining cell types of one or more BSs, wherein the cell types comprise a first cell type that supports a first set of functions or a second cell type that supports a second set of functions, and wherein the second set of functions is different than the first set of functions; and configuring at least a first BS of the one or more BSs as the first cell type and at least a second BS of the one or more BSs as the second cell type.

In an aspect, an apparatus for wireless communications is provided. The apparatus may be, for example, a UE. The apparatus generally includes means for receiving one or more downlink signals from a cell, wherein the cell is of a first cell type that supports a first set of functions or a second cell type that supports a second set of functions, and wherein the second set of functions is different than the first set of functions; means for determining a cell type of the cell based on the one or more downlink signals; and means for communicating with the cell based on the determination.

In an aspect, an apparatus for wireless communications is provided. The apparatus may be, for example, a BS. The apparatus generally includes means for identifying a cell type of the BS, wherein the BS comprises a first cell type that supports a first set of functions or a second cell type that supports a second set of functions, and wherein the second set of functions is different than the first set of functions; and means for transmitting an indication of the cell type to a UE.

In an aspect, an apparatus for wireless communications is provided. The apparatus may be, for example, a wireless node. The apparatus generally includes means for determining cell types of one or more BSs, wherein the cell types comprise a first cell type that supports a first set of functions or a second cell type that supports a second set of functions, and wherein the second set of functions is different than the first set of functions; and means for configuring at least a first BS of the one or more BSs as the first cell type and at least a second BS of the one or more BSs as the second cell type.

In an aspect, an apparatus for wireless communications is provided. The apparatus may be, for example, a UE. The apparatus generally includes a memory coupled with at least one processor, the memory and at least one processor configured to receive one or more downlink signals from a cell, wherein the cell is of a first cell type that supports a first set of functions or a second cell type that supports a second set of functions, and wherein the second set of functions is different than the first set of functions; determine a cell type of the cell based on the one or more downlink signals; and communicate with the cell based on the determination.

In an aspect, an apparatus for wireless communications is provided. The apparatus may be, for example, a BS. The apparatus generally includes a memory coupled with at least one processor, the memory and at least one processor configured to identifying a cell type of the BS, wherein the BS comprises a first cell type that supports a first set of functions or a second cell type that supports a second set of functions, and wherein the second set of functions is different than the first set of functions; and transmit an indication of the cell type to a UE.

In an aspect, an apparatus for wireless communications is provided. The apparatus may be, for example, a wireless node. The apparatus generally includes a memory coupled with at least one processor, the memory and at least one processor configured to determine cell types of one or more BSs, wherein the cell types comprise a first cell type that supports a first set of functions or a second cell type that supports a second set of functions, and wherein the second set of functions is different than the first set of functions; and configure at least a first BS of the one or more BSs as the first cell type and at least a second BS of the one or more BSs as the second cell type.

In an aspect, a computer readable medium is provided having computer executable code stored thereon for wireless communications by a UE. The computer readable medium generally includes code for receiving one or more downlink signals from a cell, wherein the cell is of a first cell type that supports a first set of functions or a second cell type that supports a second set of functions, and wherein the second set of functions is different than the first set of functions; code for determining a cell type of the cell based on the one or more downlink signals; and code for communicating with the cell based on the determination.

In an aspect, a computer readable medium is provided having computer executable code stored thereon for wireless communications by a BS. The computer readable medium generally includes code for identifying a cell type of the BS, wherein the BS comprises a first cell type that supports a first set of functions or a second cell type that supports a second set of functions, and wherein the second set of functions is different than the first set of functions; and code for transmitting an indication of the cell type to a UE.

In an aspect, a computer readable medium is provided having computer executable code stored thereon for wireless communications by a wireless node. The computer readable medium generally includes code for determining cell types of one or more BSs, wherein the cell types comprise a first cell type that supports a first set of functions or a second cell type that supports a second set of functions, and wherein the second set of functions is different than the first set of functions; and code for configuring at least a first BS of the one or more BSs as the first cell type and at least a second BS of the one or more BSs as the second cell type.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
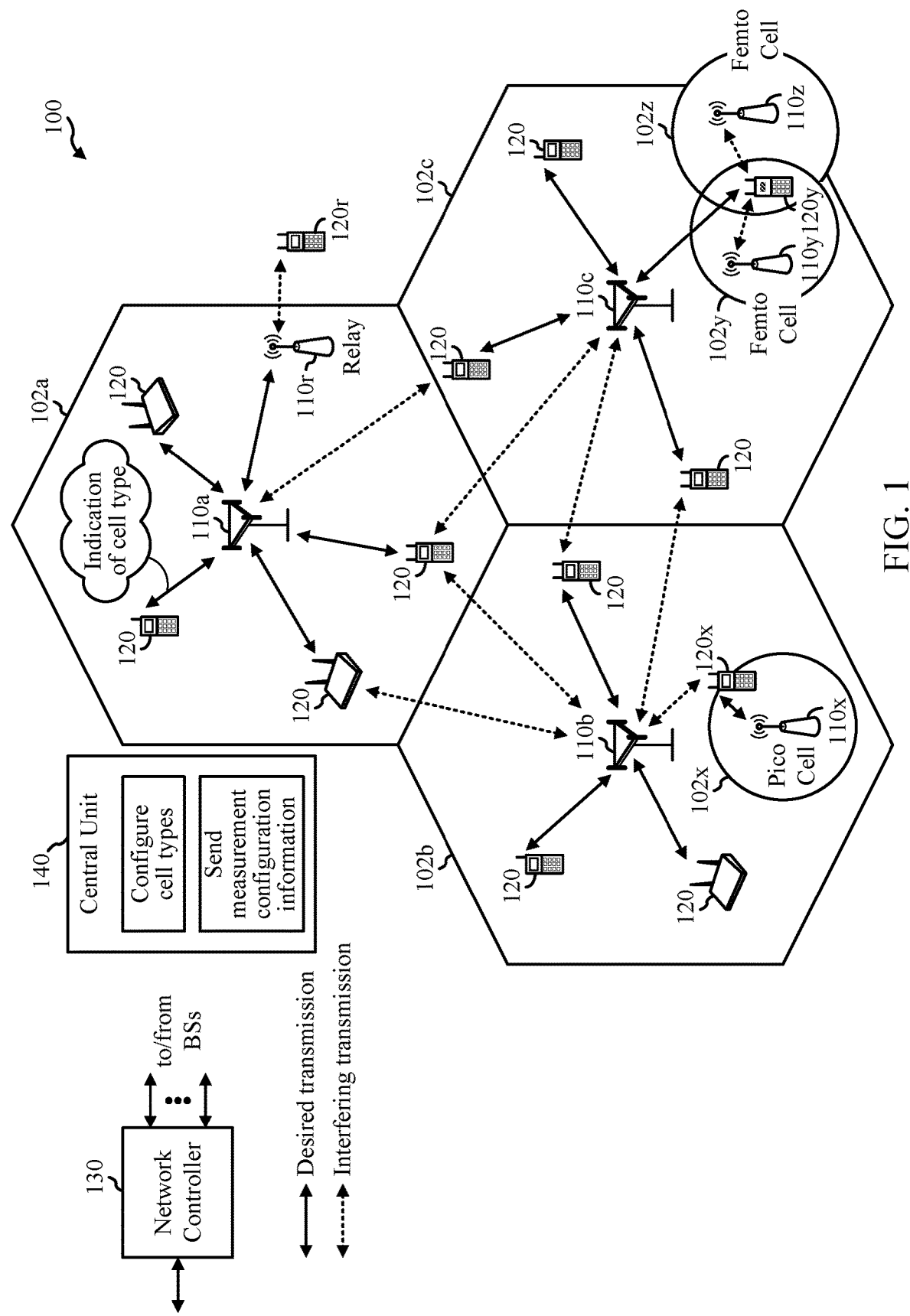
FIG. 1 is a block diagram conceptually illustrating an example wireless communications system, in accordance with certain aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than orthogonal frequency divisional multiple access (OFDMA)-based air interfaces) or fixed transport layer (e.g., other than Internet Protocol (IP)). NR may support services including enhanced mobile broadband (eMBB) targeting wide bandwidth (e.g. 80 MHz beyond), millimeter wave (mmW) targeting high carrier frequency (e.g. 60 GHz), massive machine type communications (mMTC) targeting non-backward compatible MTC techniques, and/or mission critical communication targeting ultra reliable low latency communications (URLLC). For these general topics, different techniques are considered, such as coding, low-density parity check (LDPC), and polar. NR cell may refer to a cell operating according to the new air interface or fixed transport layer.

As will be described in further detail herein, NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit synchronization signals. BSs may transmit downlink signals to UEs indicating the cell type. Based on the cell type indication, the UE may communicate with the BS. For example, the UE may determine BSs to consider for cell selection, access, handover, and/or measurement based on the indicated cell type.

In some cases, the UE can receive a measurement configuration from the radio access network (RAN). For example, the measurement configuration may be received from a BS and/or a central unit (CU). The measurement configuration information may indicate ACells and/or DCells for the UE to measure (and report). The UE may monitor/detect measurement reference signals (MRSs) from the cells based on measurement configuration information. In some cases, the UE may blindly detect the MRS. Additionally or alternatively, the UE may detect MRS based on MRS-IDs indicated from the RAN. The UE may report the measurement results.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communications network 100 in which aspects of the present disclosure may be performed. For example, wireless communications network 100 may be a new radio (NR) or 5G network. UEs 120 may configured to perform the operations 1300 discussed in more detail below for determining a cell type of a cell and communicating with the cell based on the determination. BS 110 may be configured to perform the operations 1400 discussed in more detail below for identifying the cell type and providing an indication of the cell type to the UE 120. Wireless communications network 100 may include central unit 140 configured to perform the operations 1500 discussed in more detail below for determining cell types for BSs and configuring the BSs with the cell types. According to certain aspects, UEs 120, BSs 110, and central unit 140 may be configured to perform operations related to measurement configuration, measurement reference signal transmission, monitoring, detection, measurement, and measurement reporting, which are described in greater detail below.

As illustrated in FIG. 1, wireless communications network 100 may include a number of BSs 110 and other network entities. According to an example, the network entities including BSs 110 and UEs 120 may communicate on high frequencies (e.g., >6 GHz) using beams. One or more BSs 110 may also communicate at a lower frequency (e.g., <6 GHz). The one or more BSs 110 configured to operate in a high frequency spectrum and the one or more BSs 110 configured to operate in a lower frequency spectrum may be co-located. BS 110 may be a transmission reception point (TRP), a Node B (NB), a 5G NB, a gNB, an access point (AP), a NR BS, Master BS, primary BS, etc. Wireless communications network 100 may include central unit 140. Central unit 140 may configure BSs 110 as cell types. Central unit 140 may send measurement configuration information to UEs 120.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, NB, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in wireless communications network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communications network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in wireless communications network 100. For example, macro BS may have a high transmit power level (e.g., 20 Watts) whereas pico BS, femto BS, and relays may have a lower transmit power level (e.g., 1 Watt).

Wireless communications network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. In on example, NR resource blocks may span 12 sub-carriers with a sub-carrier bandwidth of 15 kHz over a 1 ms duration. Each radio frame may consist of 10 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or distributed units (DUs).

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, NB, 5G NB, TRP, AP, etc.) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases, DCells may not transmit synchronization signals—in other case cases DCells do transmit synchronization signals. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
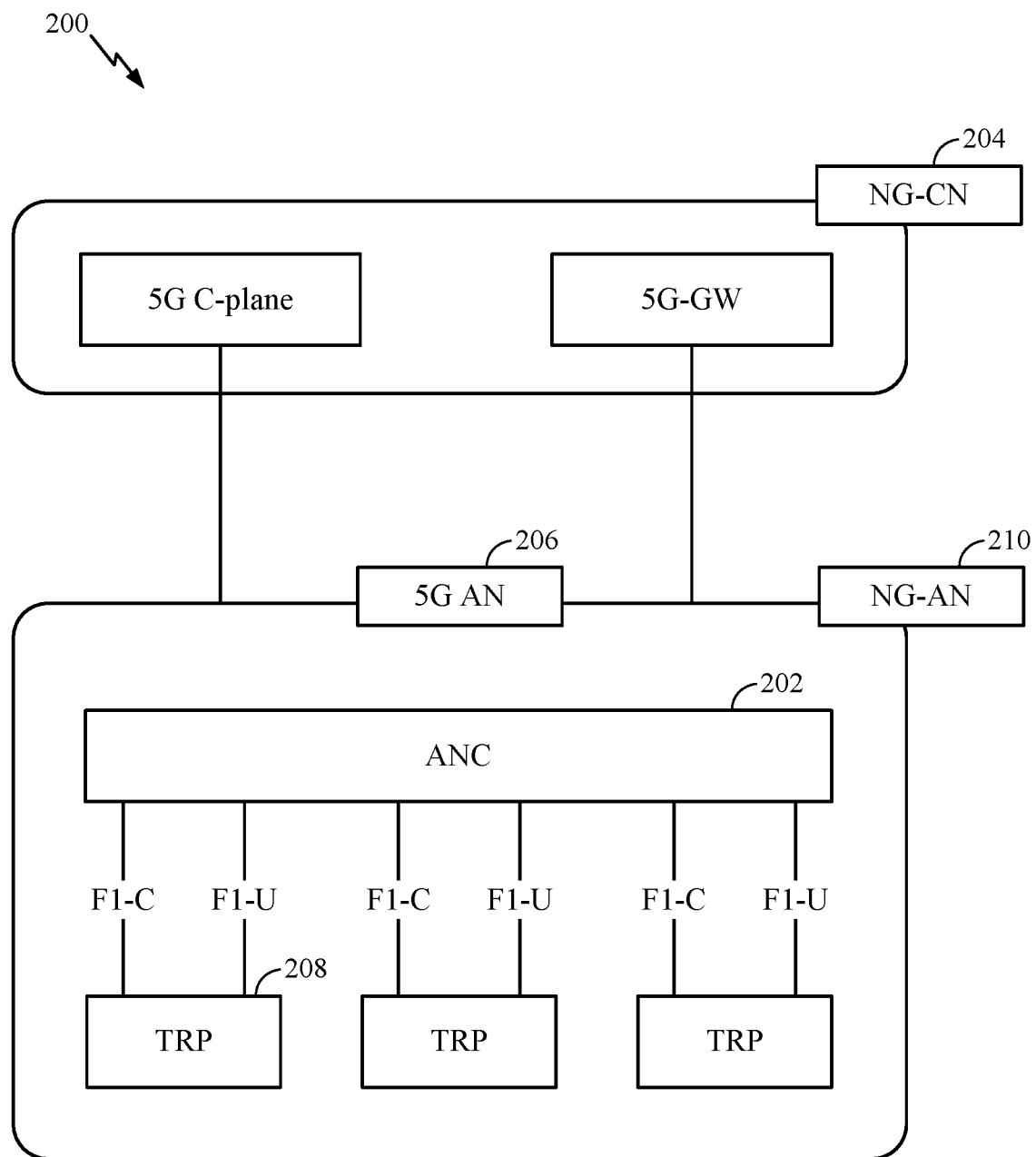
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

According to certain aspects of the present disclosure, TRPs 208 may be configured as ACells or DCells. For example, ANC 202 can configure the cell types for TRPs 208. TRPs 208 may indicate the configured cell type to a UE.

A TRPs 208 may be a DU. TRPs 208 may be connected to one ANC (ANC 202) or more than one ANC (not illustrated). For example, for RAN sharing, radio as a service (RaaS), and service specific AND deployments, the TRP 208 may be connected to more than one ANC. A TRP 208 may include one or more antenna ports. The TRPs 208 may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a CU (e.g., ANC 202) and/or one or more distributed units (e.g., one or more TRPs 208).

Figure 3:
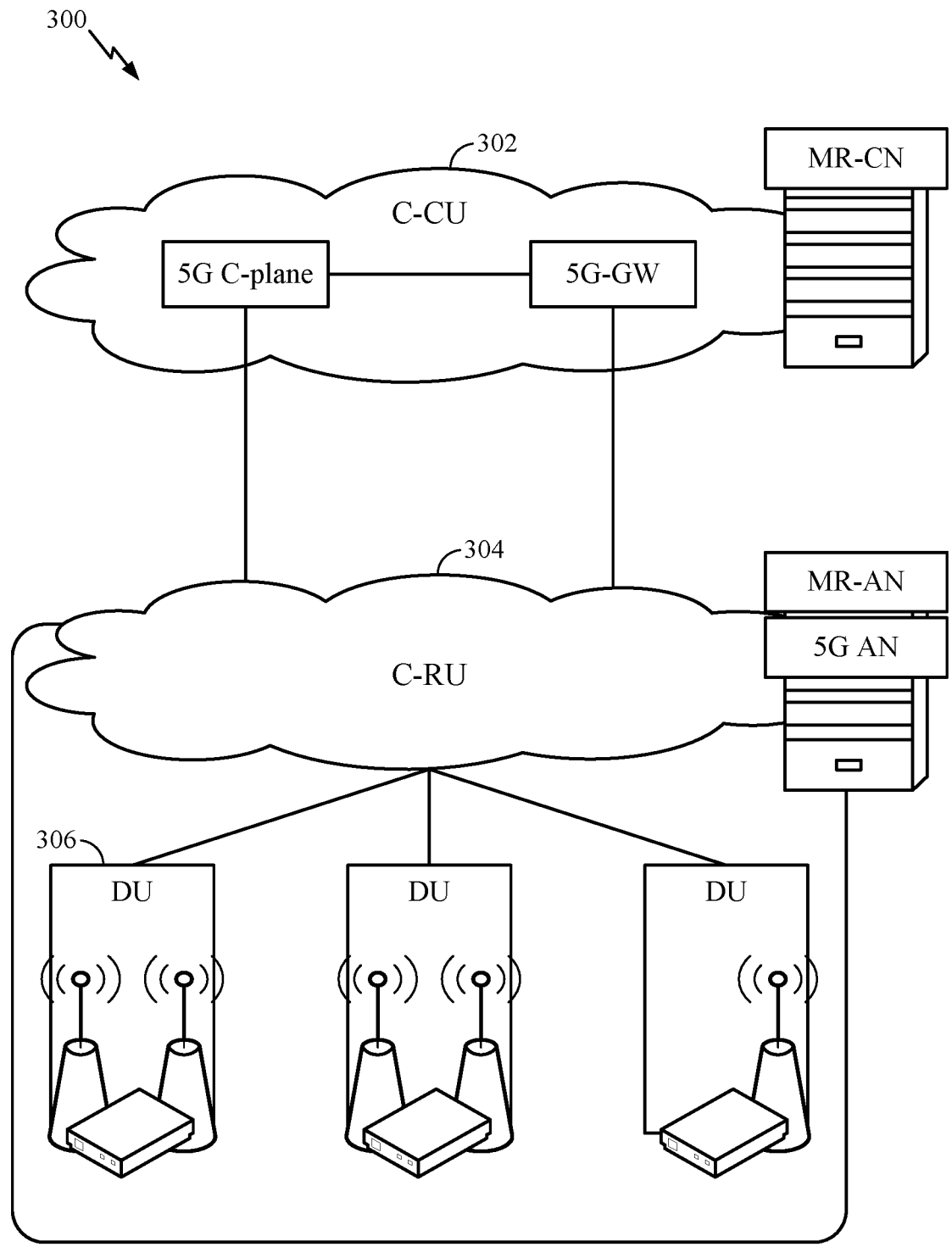
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
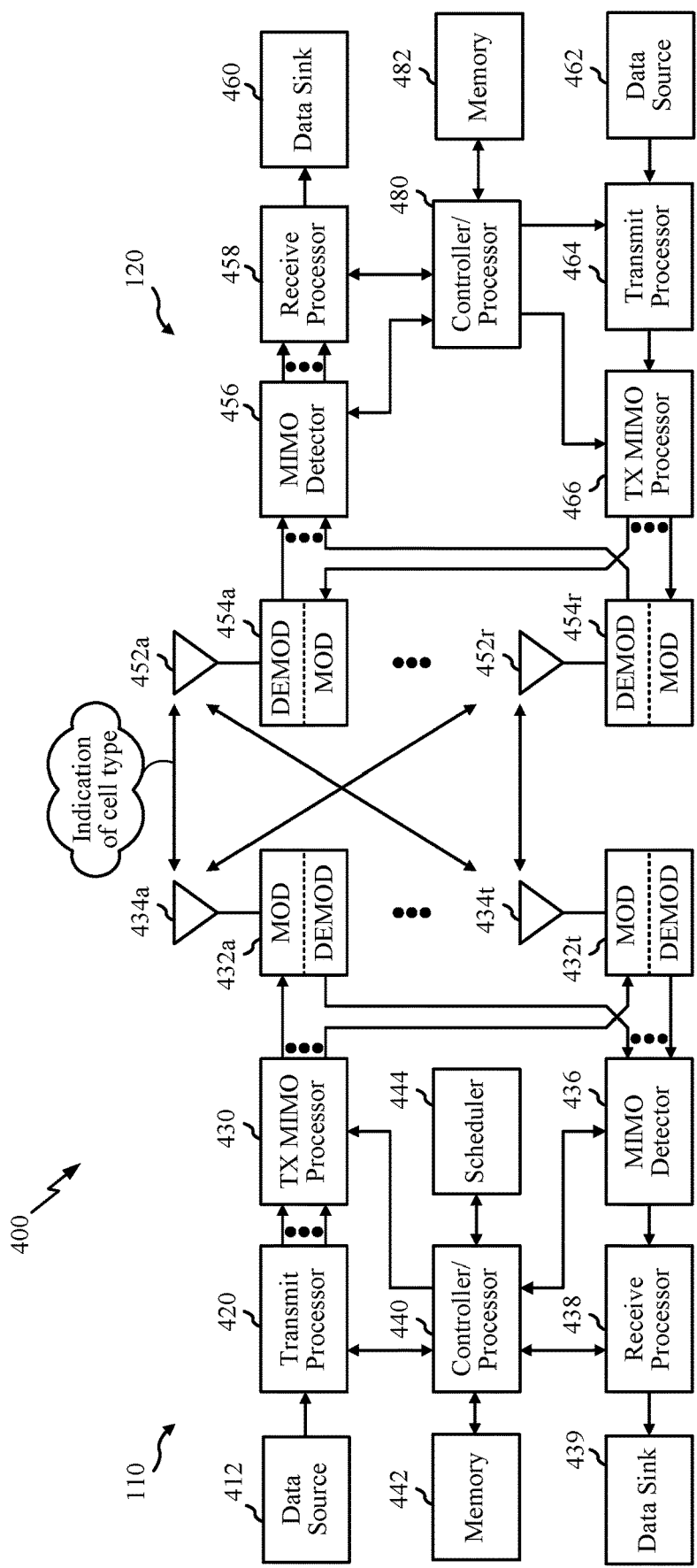
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. The BS may be a gNB, TRP, NR BS, etc., and may be referred to as a Master eNB (MeNB) (e.g., Master BS, primary BS). The Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of BS 110 and UE 120 may be used to practice aspects of the present disclosure. For example, antennas 452, Tx/Rx 454, processors 466, 458, 464, and/or controller/processor 480 of UE 120 and/or antennas 434, processors 420, 430, 438, and/or controller/processor 440 of BS 110 may be used to perform the operations described herein and illustrated with reference to FIGS. 13-15. As shown in FIG. 4, BS 110 may be configured to send an indication of the cell type to UE 120.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 8, and/or other processes for the techniques described herein. The memories 442 and 482 may store data and program codes for the BS 110 and the UE 120, respectively. A scheduler 444 may schedule UEs for data transmission on the downlink and/or uplink.

Figure 5A:
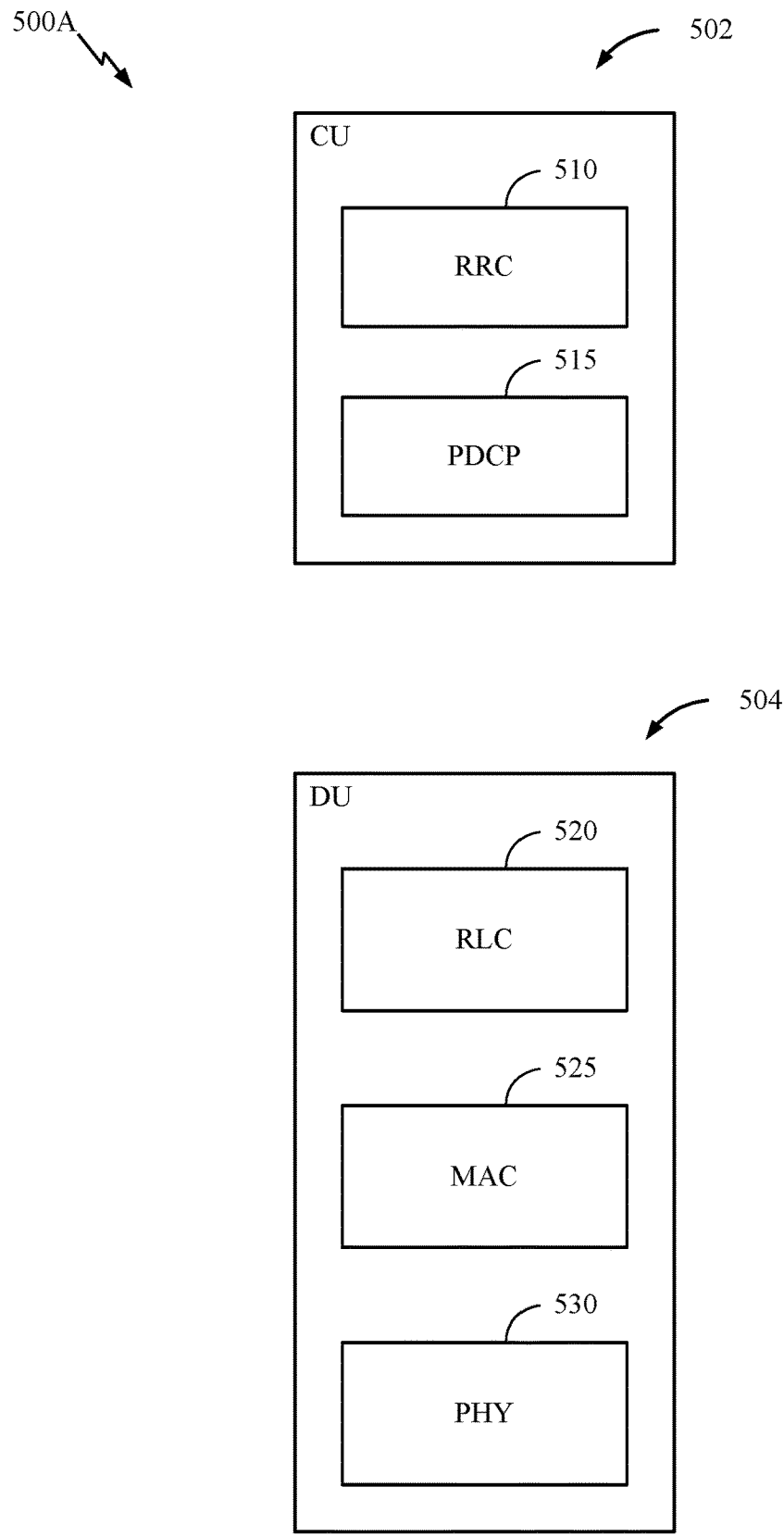
FIG. 5A is a diagram showing an example for a split implementation of a communication protocol stack between a central unit (CU) and distributed unit (DU), in accordance with certain aspects of the present disclosure.
Figure 5B:
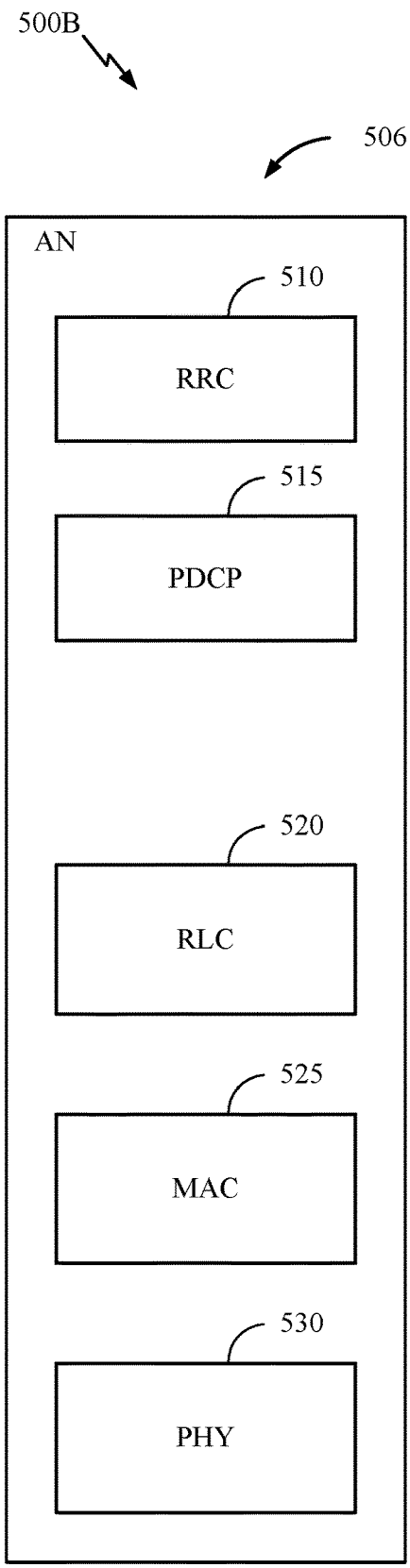
FIG. 5B is a diagram showing an example for a unified implementation of a communication protocol stack at an access node (AN), in accordance with certain aspects of the present disclosure.

FIGS. 5A-5B illustrate examples for implementing a communications protocol stack, according to aspects of the present disclosure. The illustrated communications protocol stacks may be implemented by devices operating in a 5G system. FIGS. 5A-5B illustrate a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device including, for example, AN 506, CU 502, DU 504, and/or a UE 508.

For example, FIG. 5A shows a split implementation 500A of a protocol stack, in which implementation of the protocol stack is split between CU 502, a centralized network access device (e.g., such as an ANC 202 in FIG. 2), and DU 504, a distributed network access device (e.g., such as DU 208 in FIG. 2). As shown in FIG. 5A, RRC layer 510 and PDCP layer 515 may be implemented by CU 502, and RLC layer 520, MAC layer 525, and PHY layer 530 may be implemented by DU 504. CU 502 and DU 504 may be collocated or non-collocated. The split implementation 500A illustrated in FIG. 5A may be useful in a macro cell, micro cell, or pico cell deployment.

Alternatively, FIG. 5B shows a unified implementation 500B of the protocol stack, in which the protocol stack is implemented in AN 506, a single network access device (e.g., an AN, NR BS, NR NB, network node (NN), etc.). As shown in FIG. 5B, RRC layer 510, PDCP layer 515, RLC layer 520, MAC layer 525, and PHY layer 530 may each be implemented by the AN 506. The unified implementation 500B may be useful in a femto cell deployment.

Figure 5C:
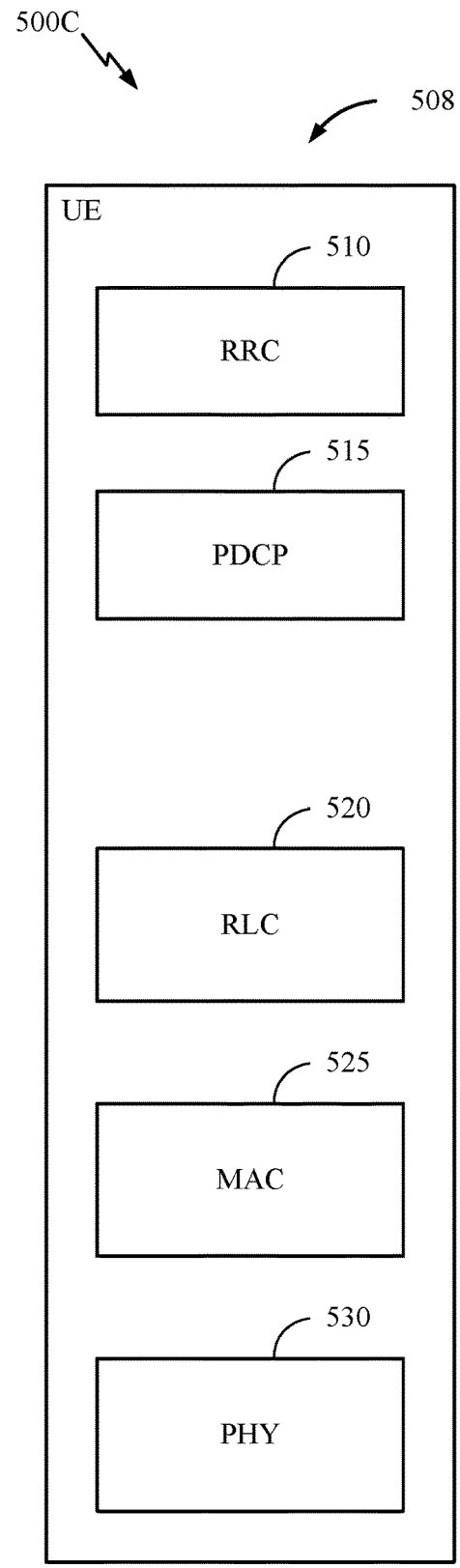
FIG. 5C is a diagram showing an example for a unified implementation of a communication protocol stack at a UE, in accordance with certain aspects of the present disclosure.

Regardless of whether a network access device implements part or all of a protocol stack, a UE may implement an entire protocol stack. For example, as shown in FIG. 5C, UE 508 implements RRC layer 510, PDCP layer 515, RLC layer 520, MAC layer 525, and PHY layer 530.

Figure 6:
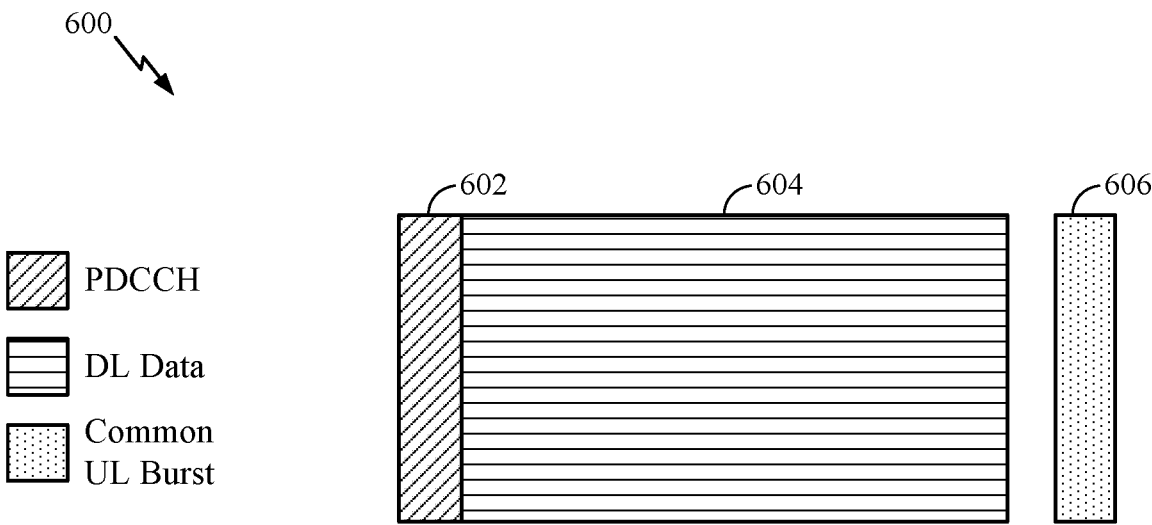
FIG. 6 illustrates an example of a downlink-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
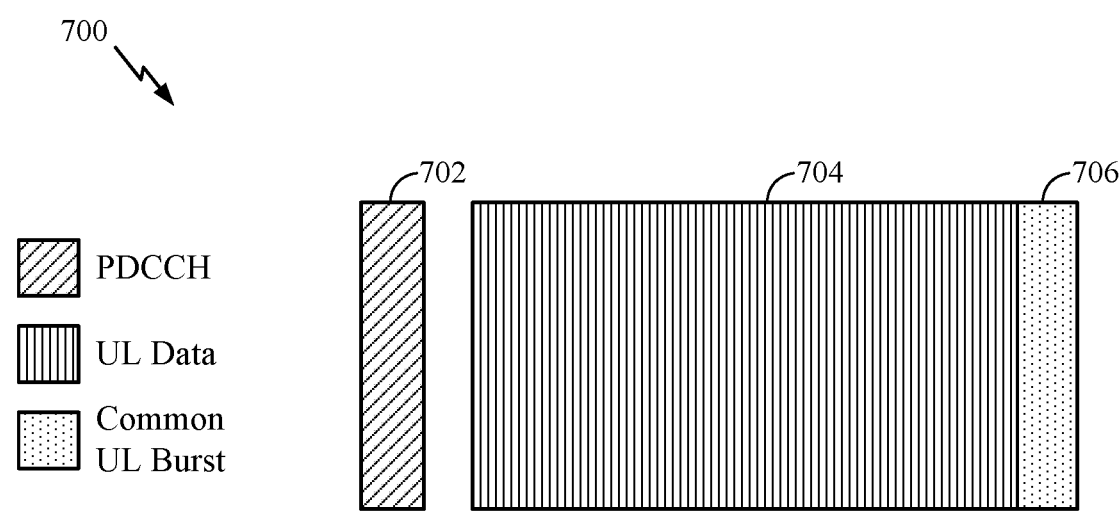
FIG. 7 illustrates an example of an uplink-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation

Figure 8:
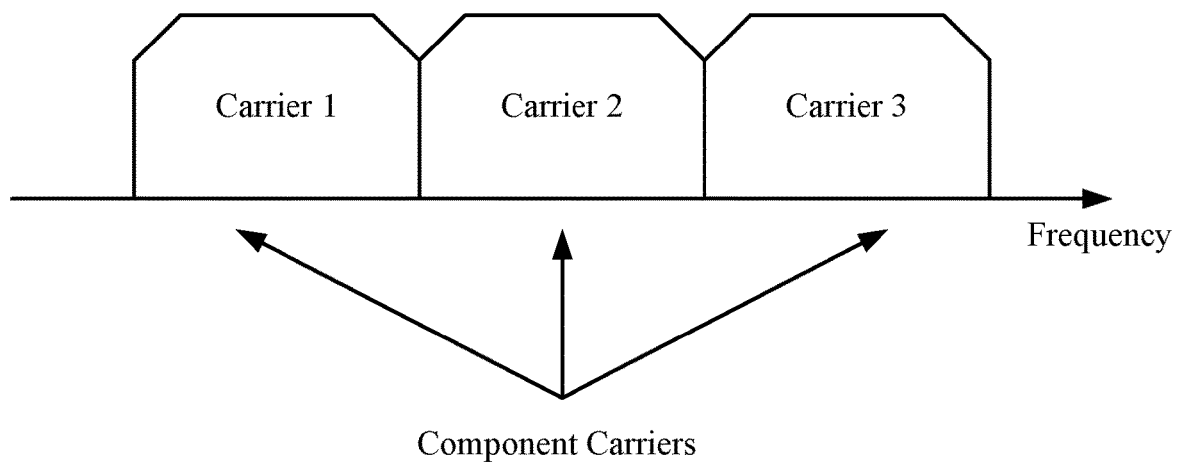
FIG. 8 illustrates an example continuous carrier aggregation type, in accordance with certain aspects of the present disclosure.
Figure 9:
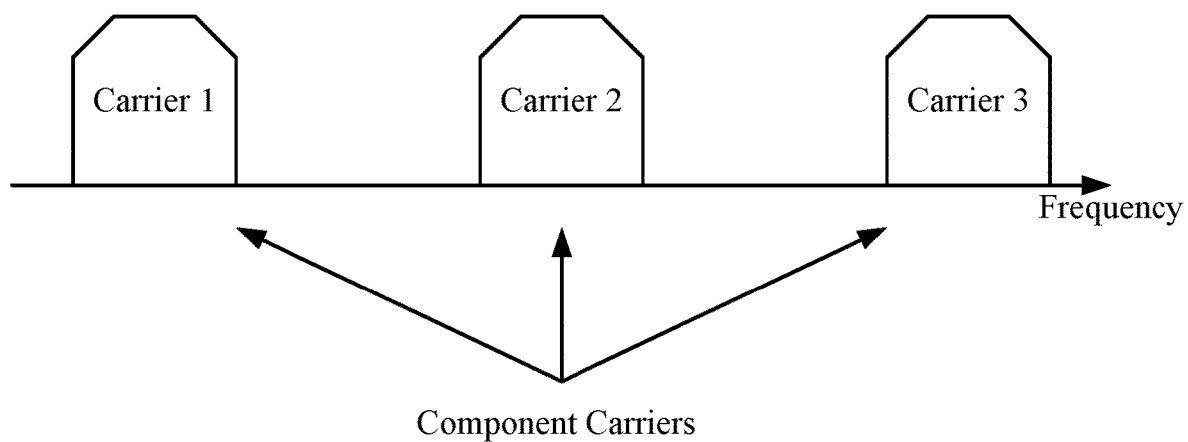
FIG. 9 illustrates an example non-continuous carrier aggregation type, in accordance with certain aspects of the present disclosure.

In certain systems (e.g., LTE-Advanced), UEs may use spectrum of up to 20 MHz bandwidths allocated in a carrier aggregation of up to a total of 100 MHz (5 component carriers) used for transmission in each direction. Two types of carrier aggregation (CA) techniques may be employed—continuous CA and non-continuous CA. These techniques are illustrated in FIGS. 8 and 9, respectively. Continuous CA occurs when multiple available component carriers are adjacent to each other as shown in FIG. 8. On the other hand, non-continuous CA occurs when multiple available component carriers are separated along the frequency band as shown in FIG. 9. Both non-continuous and continuous CA aggregates multiple component carriers to serve a single UE.

Figure 10:
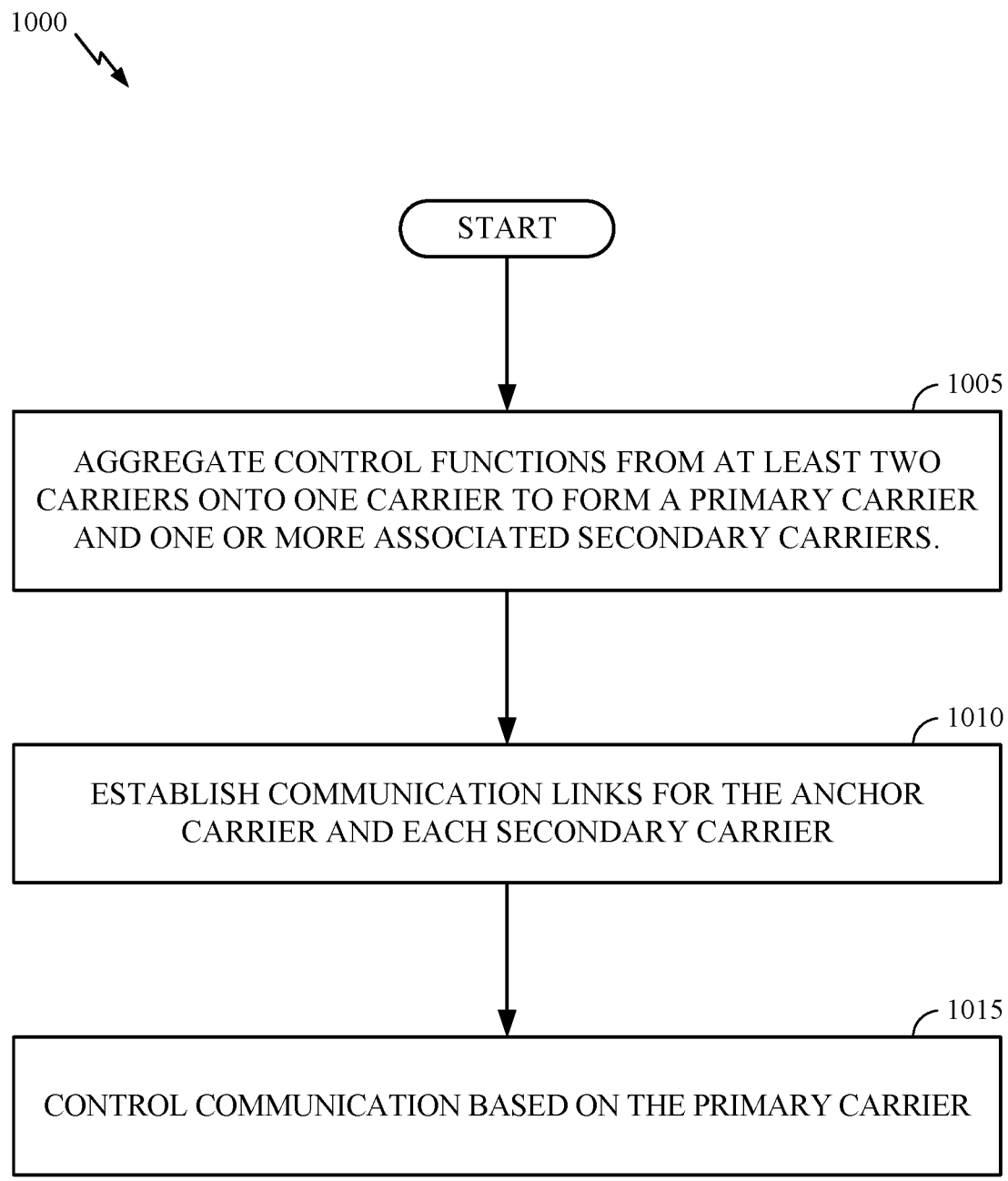
FIG. 10 is a block diagram illustrating example operations for controlling radio links in multiple carrier configurations, in accordance with certain aspects of the present disclosure.

A UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). FIG. 10 illustrates a method 1000 for controlling radio links in a multiple carrier wireless communication system by grouping physical channels according to one example. As shown in FIG. 10, the method includes, at block 1005, aggregating control functions from at least two carriers onto one carrier to form a primary carrier and one or more associated secondary carriers. Next at block, 1010, communication links are established for the primary carrier and each secondary carrier. Then, communication is controlled based on the primary carrier in block 1015.

Example Multi-Connectivity

Figure 11:
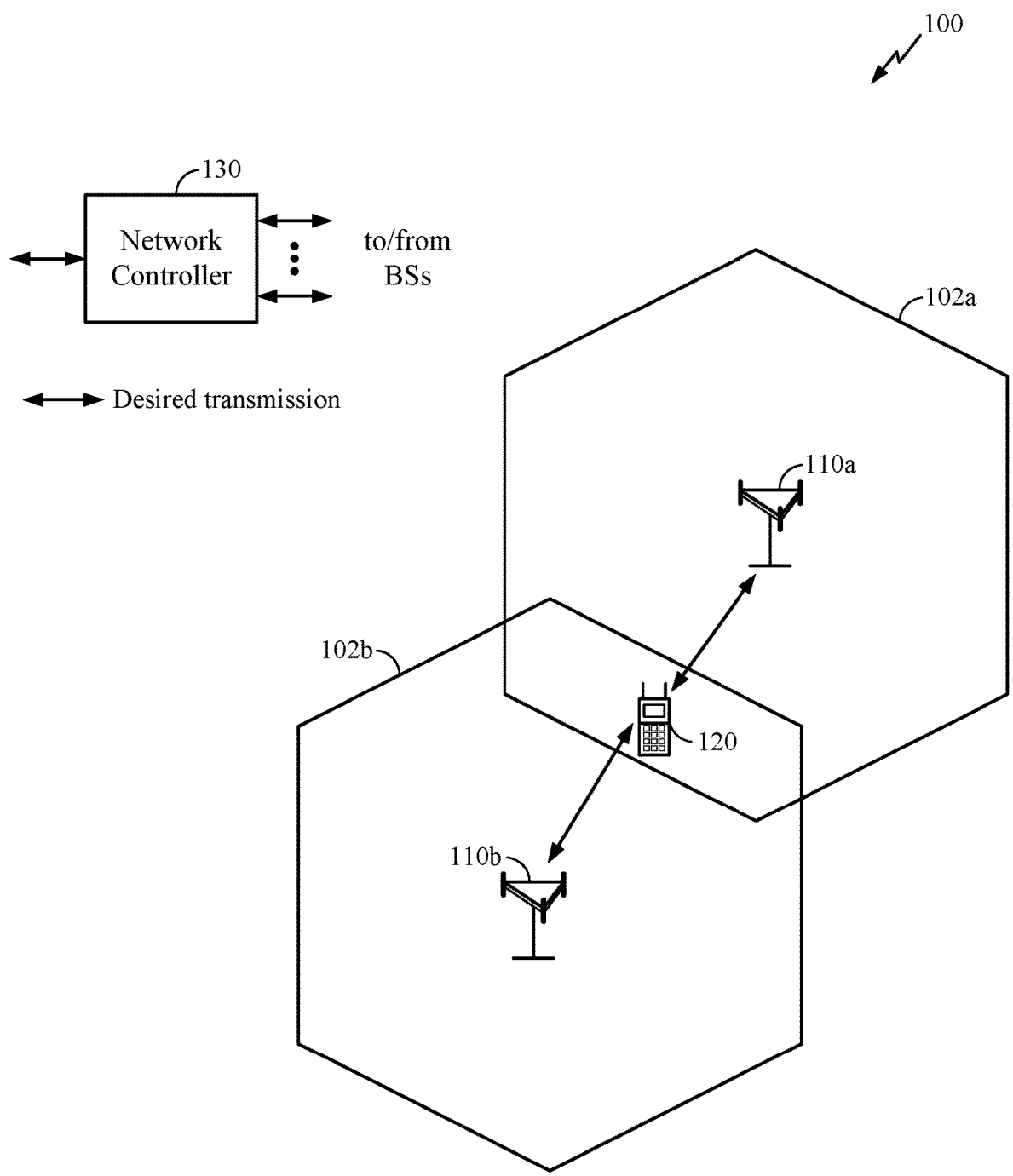
FIG. 11 illustrates an example dual connectivity scenario using multiflow to deliver simultaneous data streams, in accordance with certain aspects of the present disclosure.

Mobile devices (e.g., such as UEs 120) can receive data from a base station (e.g., such as BS 110). However, users on a cell edge may experience high inter-cell interference which may limit the data rates. Multiflow allows users to receive data from multiple BSs simultaneously. For example, for dual-connectivity, the UE sends and receives data from two BSs in two separate streams when the UE is in range of two cell towers in two adjacent cells at the same time. The UE communicates with the two towers simultaneously when the UE is on the edge of either towers' reach (e.g., as shown in FIG. 11). By scheduling two independent data streams to the UE from two different BSs at the same time, multiflow exploits uneven loading in networks. This helps improve the cell edge user experience while increasing network capacity. In one example, throughput data speeds for users at a cell edge may double. "Multiflow" is similar to dual-carrier HSPA, however, there are differences. For example, dual-carrier HSPA does not allow for connectivity to multiple towers to connect simultaneously to a device.

Dual connectivity may have benefits in the cellular industry. Dual Connectivity can significantly improve per-user throughput and mobility robustness by allowing users to be connected simultaneously to master cell group (MCG) and secondary cell group (SCG) via master BS and secondary BS, respectively. The increase in per-user throughput is achieved by aggregating radio resources from at least two BSs. Moreover, dual connectivity also helps in load balancing between MCG and SCG.

The master BS and secondary BS may not be collocated and can be connected via a non-ideal backhaul (e.g., backhaul). Thus, the different BSs may use different schedulers, etc. For example, the UE may be dually connected to the a macro cell and the small cell, and the BSs may be connected via a non-ideal backhaul and operate on different carrier frequencies. With carrier aggregation multiple component carriers are aggregated to serve a single UE.

In certain aspects, due to the distributed nature of this deployment scenario (separate BSs connected via a non-ideal backhaul) separate uplink control channels for both BSs (master BS and secondary BS) are used to support distributed scheduling and independent medium access control (MAC) operation across BSs. This is unlike carrier aggregation deployment, in which a single MAC/scheduling entity operates across all the carriers and a single uplink control channel is used.

In certain systems, the Primary Cell (PCell of master BS) is the only cell carrying the uplink control channels (e.g., the physical uplink control channel (PUCCH)). For dual connectivity, a special cell on the secondary BS may support the uplink control channels for the secondary BS. Also, with dual connectivity uplink control channels for both the master BS and the secondary BS are used, one for each BS.

In aspects, for multi-connectivity, the UE may receive data from more than two BSs.

Example New Radio Cell Measurement

New radio (NR) may refer to devices configured to operate according a wireless standard, such as 5G (e.g. wireless communications network 100). NR cell may refer to a cell operating in the NR network and may also be referred to as a NR BS, a node B (NB), a 5G NB, an access point (AP), a gNB, etc. The NR radio access network (RAN) architecture may include a central unit (CU) (e.g., such as central unit 140). The CU may be an access node controller (e.g., such as ANC 202).

As used herein, a cell may refer to a combination of downlink (DL), and potentially also uplink (UL), resources. The linking between the carrier frequency of the downlink resources and the carrier frequency of the uplink resources is indicated in system information (SI) (e.g., global cell ID) transmitted on the downlink resources. For example, NR BSs can transmit (e.g., advertise) the system information in a physical broadcast channel (PBCH) carrying a master information block (MIB).

Figures 12A, 12B, 12C, 12D:
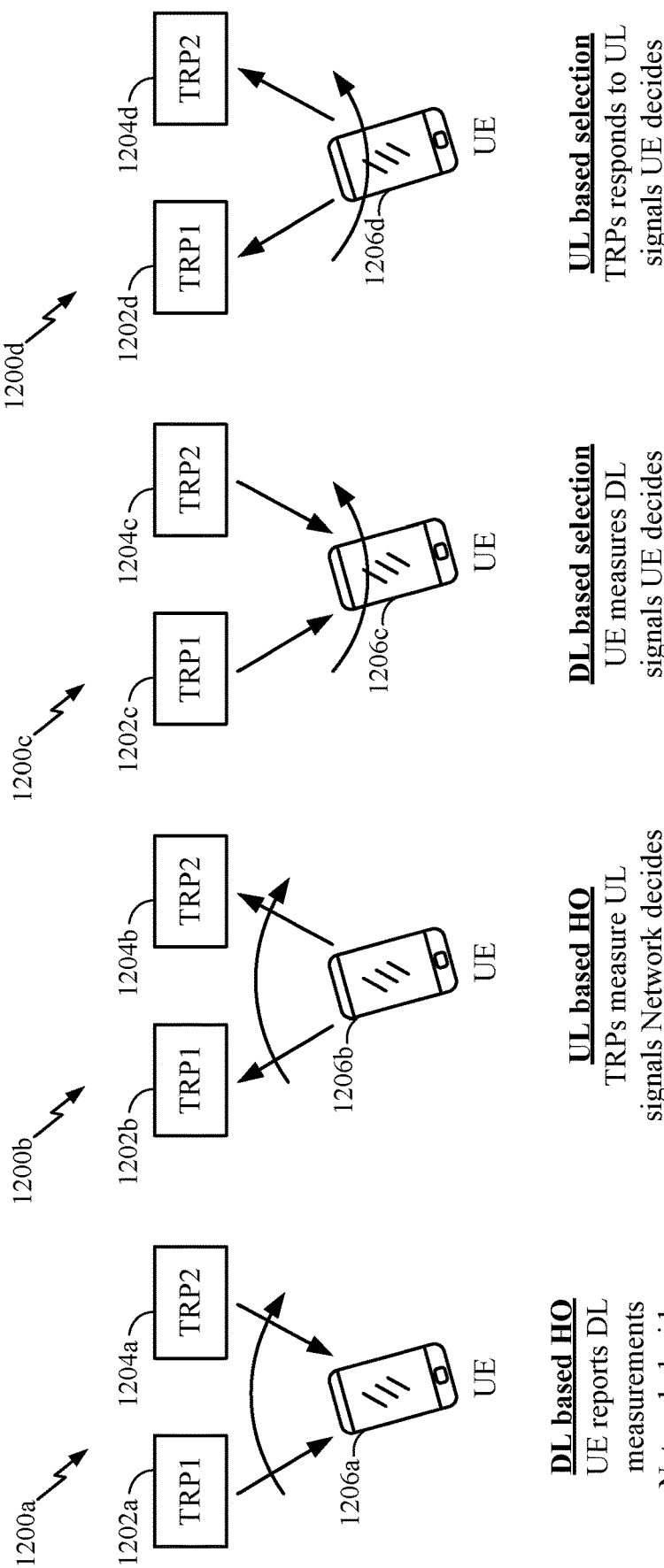
FIGS. 12A-12D illustrate example mobility scenarios, in accordance with certain aspects of the present disclosure.

In certain systems (e.g., NR or 5G systems), mobility while in connected mode can encompasses four mobility scenarios, illustrated in FIGS. 12A-12D. These scenarios may be based in part on whether the user equipment (e.g., such as a UE 120) or the RAN determines that the UE should switch from one BS to another BS. As shown in FIGS. 12C and 12D, reselection occurs where the UE makes the determination, and as shown in FIGS. 12A and 12B, a handover occurs where the RAN makes the determination. The determination of whether to handover or reselect may also occur based on measurements made on a DL or UL reference signal. In NR, there may be two levels of network controlled mobility. For example, mobility may be radio resource control (RRC) driven at the cell level (layer) or driven with little to no RRC involvement, for example, at the medium access control (MAC) or physical (PHY) level.

In the mobility scenario 1200*a* illustrated in FIG. 12A, UE 1206*a* reports downlink measurements of TRP1 1202*a* and/or TRP2 1204*a* and the network (e.g., RAN) makes the handover decision based on the reports. In the mobility scenario 1200*b* illustrated in FIG. 12B, TRP1 1202*b* and/or TRP2 1204*b* measure uplink signals from UE 1206*b* and the network (e.g., RAN) makes the handover decision based on the measurements. In the mobility scenario 1200*c* illustrated in FIG. 12C, UE 1206*c* measures TRP1 1202*c* and/or TRP2 1204*c* and makes the reselection decision based on the measurements. In the mobility scenario 1200*d* illustrated in FIG. 12D, TRP1 1202*d* and/or TRP2 1204*d* respond to UL signaling from UE 1206*d* and the UE 1206*d* makes the reselection decision based on the responses from the TRPs.

As mentioned above, carrier aggregation (CA) increases the channel bandwidth by combining multiple radio frequency (RF) carriers. Applications data can be sent and received by multiple RF carriers rather than by a single RF carrier. CA cells include the primary cell (Pcell) and the secondary cell (Scell). As also mentioned above, multi-connectivity (including dual connectivity (DC)) improves per-user throughput and provides mobility robustness by allowing users to be connected simultaneously to multiple cells—master cell group (MCG) and one or more secondary cell group (SCG).

In certain systems (e.g., certain long term evolution (LTE) systems), both Scell and SCG cells transmit synchronization signals (e.g., primary synchronization signal (PSS) and/or secondary synchronization signals (SSS)) and reference signals (e.g., such as common reference signals (CRS)). The CRS is a common RS for all UEs sent via cell-specific antenna ports. CRS may be used to determine the phase reference for demodulating downlink control channels and used to generated channel state information (CSI) feedback.

Since the Scell and SCG cells transmit synchronization signals and reference signals, idle mode UEs may detect the Scell and/or SCG cells when performing search and detection and attempt to camp on them. However, this procedure may fail if the network does not permit access on these cells. Thus, there may be unnecessary battery drain and service disruption (e.g., paging). In addition, the periodic transmission of PSS, SSS and CRS on the SCell and SCG cells causes increased pilot pollution in those channels and also causes energy wastage at the cells.

Accordingly, what is needed are techniques and apparatus for NR cell measurement. Aspects of the present disclosure provide apparatus, methods, processing systems, and computer program products for NR cell measurement, as well as for reporting measurements.

Example NR Cell Types

According to certain aspects, certain systems, for example NR systems, may include different cell types that may support different sets of functions. For example, cell types may include Access cell (ACell) type and Data only cell (DCell) type. ACells may provide basic coverage, and may be available for system acquisition, cell reselection, handover, and/or initial system access. Both idle mode UEs and connected mode UEs may use (e.g., access) ACell cells. ACell cells may transmit synchronization signals (SS) such as PSS and SSS, reference signals such as measurement reference signals (MRS), and system information such as a MIB transmitted in the PBCH. MRS is a RS, sent broadcast or on-demand, used to measure a BS (e.g., a cell) on the downlink for handover and/or reselection.

Synchronization signals may be broadcast by all BSs in a zone (e.g., a zone synchronization signal (ZSS)). The synchronization signals may include PSS, SSS, and/or PBCH (e.g., carrying a MIB) which may include a RS for use in decoding. UEs may use PSS and/or SSS to determine the frame timing (e.g., frame boundary) and cell-ID. The PSS/SSS may carry a physical cell identifier (PCI). Synchronization signals may be present (e.g., transmitted) at a configurable periodicity. Measurement reference signal (MRS) is a signal used by UEs to measure a cell on the downlink. The MRS measurements may be used for making decisions for handover, selection, and/or reselection. In aspects, the synchronization signals (and in some cases, also the PBCH), may be used by UEs to measure a cell on the downlink. In this case, MRS may not be transmitted or, the MRS may be transmitted in addition to the synchronization signals and/or PBCH.

DCells may be a subset of ACells in terms of functionality. The DCells may be optimized for network energy efficiency. The primary function of the DCells may be boosting data capacity. For example, the DCells may be a supplemental data cell in addition to the ACell cells. For example, DCells may be used for carrier aggregation, dual connectivity, and/or multi-connectivity. DCells may support a reduced number of services. For example, the DCells may not be used for system acquisition, reselection, and/or initial system access and the DCells may not be used for handover from ACell cells. DCells may be used only by connected mode UEs—not by idle mode UEs. DCells may transmit only MRS and may not transmit synchronization signals and/or system information over-the-air (OTA). The cells may turn on and off dynamically, for example, based on cell type. This may lead to increased energy efficiency in the network.

According to certain aspects, idle mode UEs may not perform searches for the DCells and may not attempt to camp on the DCells. The UE can determine the cell type (ACell or DCell) based on an indication (explicit or implicit) in downlink signaling from the cell. Information regarding the cell type may be provided in PSS, SSS, PBCH, RS, MRS, or system information. The indication may be provided explicitly in the signaling or may be provided implicitly, for example, by presence of PSS/SSS (e.g., indicating the cell is ACell) or absence of the PSS/SSS (e.g., indicating the cell is DCell). The downlink signaling may include a value, such as an identifier (e.g., a physical cell ID (PCI) or virtual cell ID (VCID)) or a range of identifiers associated with a cell type. For example, the UE may receive signaling indicating a range of PCIs associated with DCells. Alternatively, DCells may not transmit MRS and/or in some cases, DCells do transmit PSS, SSS, RS, PBCH, and/or system information.

According to certain aspects, synchronization signals and/or MRS may be broadcast periodically or transmitted "on-demand". For example, the SS and/or MRS may be sent at a periodicity configured by the RAN. Alternatively, the SS and/or MRS may be requested (e.g., on-demand) by the UE or the RAN.

Figure 13:
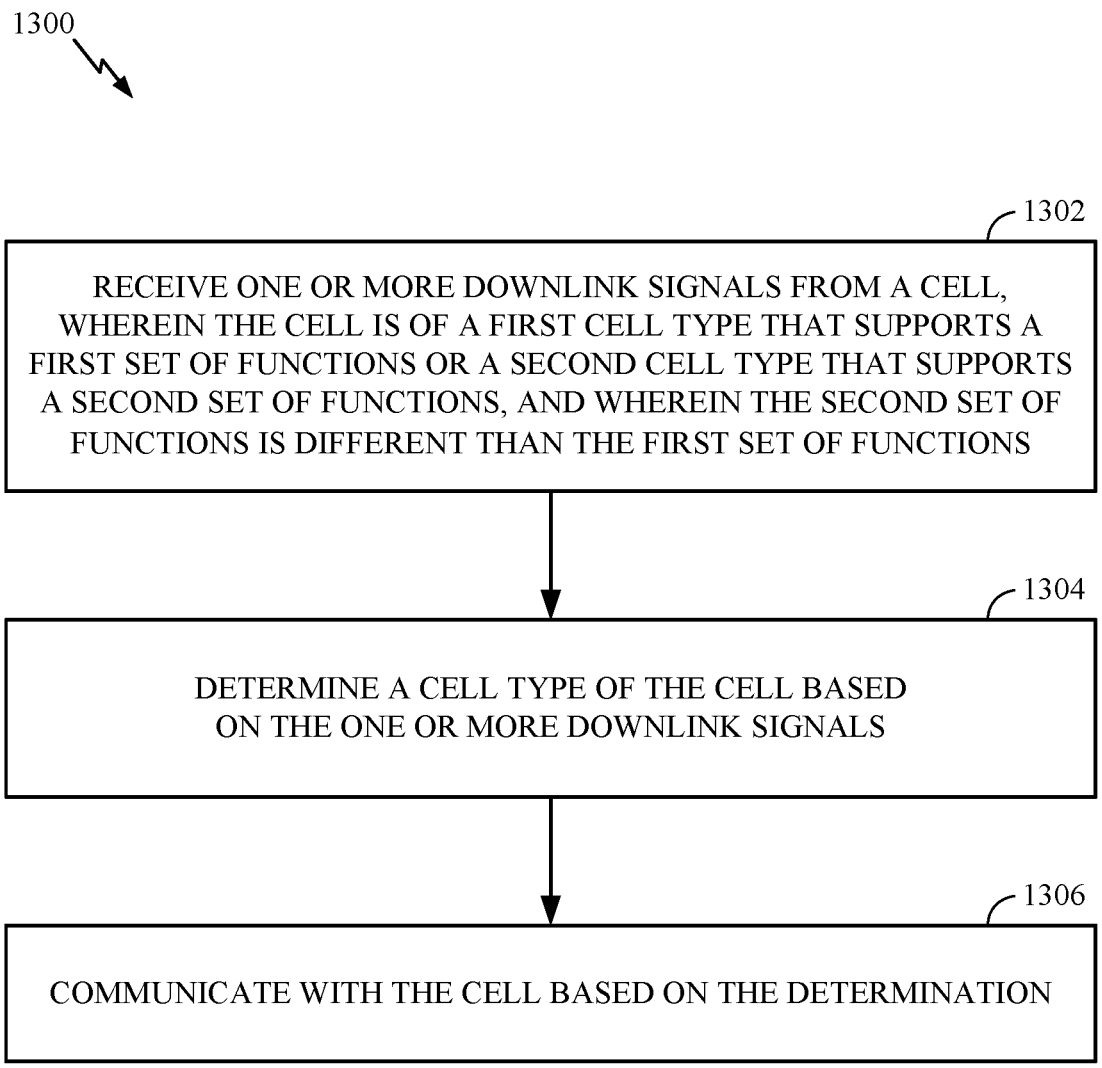
FIG. 13 is a flowchart illustrating example operations for wireless communications by a UE, in accordance with certain aspects of the present disclosure.

FIG. 13 illustrates example operations 1300 for wireless communications, in accordance with certain aspects of the presented disclosure. The operations 1300 may be performed, for example, by a UE (e.g., such as a UE 120). Operations 1300 may begin at 1302 by receiving one or more downlink signals from a cell, wherein the cell is of a first cell type (e.g., ACell) that supports a first set of functions (e.g., including transmission of PSS, SSS, PBCH, RS, MRS, SI and availability for system access, reselection, and handover) or a second cell type (e.g., DCell) that supports a second (e.g., limited) set of functions (e.g., available only for CA and/or multi-connectivity), wherein the second set of functions is different than the first set of functions.

At 1304, the UE determines the cell type of the cell based on the one or more downlink signals. For example, based on an explicit (PCI, VCI) or implicit (presence or absence of a synchronization signal) indication.

At 1306, the UE communicates with the cell based on the determination. For example, the UE may include or ignore the cell for initial access, cell selection, cell reselection, and/or handover.

According to certain aspects, the UE may receive configuration information (e.g., from the cell or from the network) indicating cell types for the UE to perform measurement reporting. Based on the configuration information, the UE may measure MRS from the cell to obtain measurement results, and transmit measurement reports indicating the measurement results.

Figure 14:
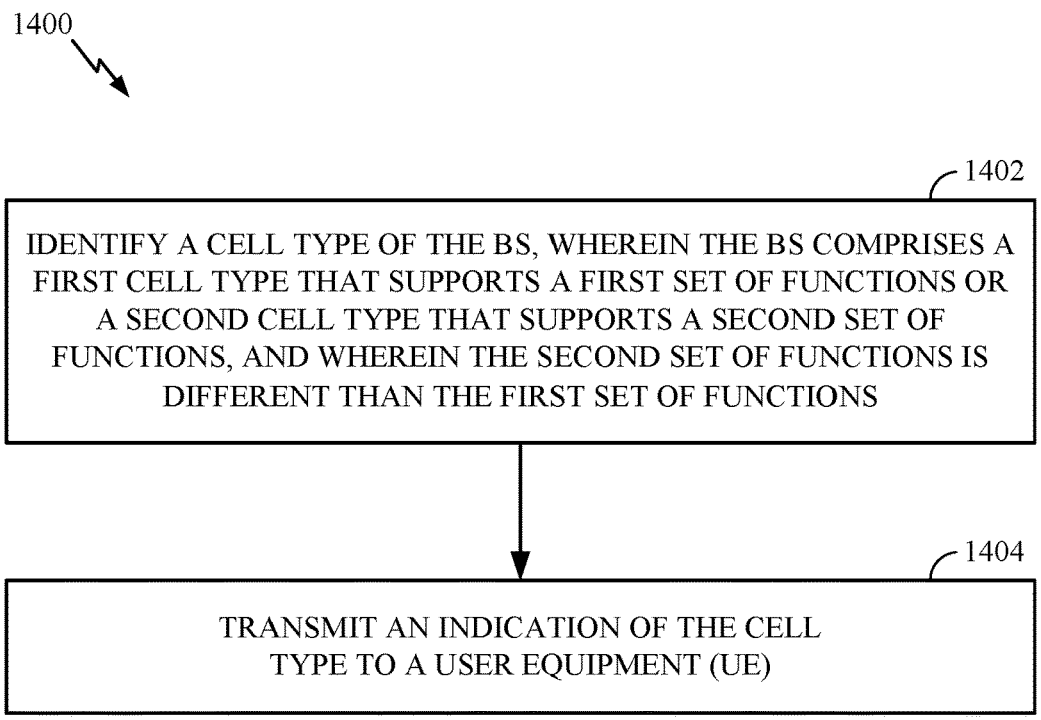
FIG. 14 is a flowchart illustrating example operations for wireless communications by a transmission reception point, in accordance with certain aspects of the present disclosure.

According to certain aspects, the indication of the cell type can be indicated to the UE by a BS (e.g., BS 110). FIG. 14 illustrates example operations 1400 for wireless communications, in accordance with certain aspects of the presented disclosure. The operations 1400 may be performed, for example, by a BS. Operations 1400 may begin at 1402 by identifying a cell type of the BS, wherein the BS comprises a first cell type that supports a first set of functions or a second cell type that supports a second set of functions, wherein the second set of functions is different than the first set of functions. At 1404, the BS transmits an indication of the cell type to a UE. The BS provides an explicit indication (e.g., a PCI or VCID) of the cell, and a certain value range of the identifier or the virtual identifier corresponding to a specific cell type in one or more downlink signals to the UE. In some cases, the cell type may be implicitly indicated by presence or absence of a synchronization signal. For example, presence of the SS may indicate ACell and absence of the SS may indicate DCell.

Figure 15:
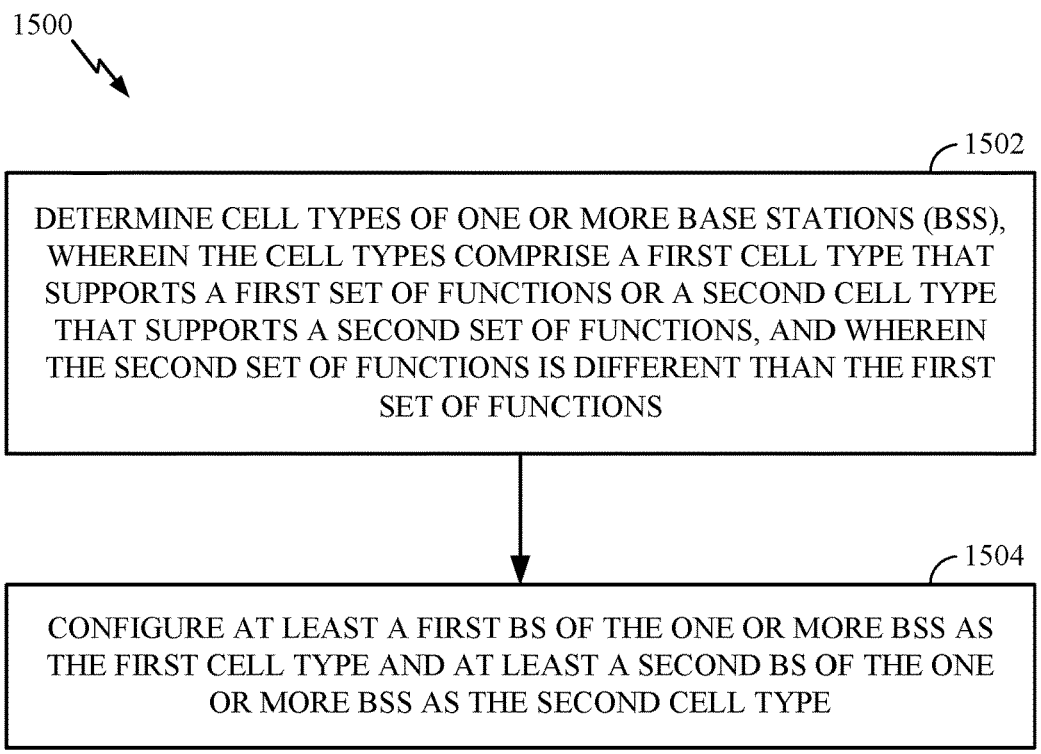
FIG. 15 is a flowchart illustrating example operations for wireless communications by a wireless node, according to aspects of the present disclosure.

According to certain aspects, the BSs can be configured as ACell or DCell by the RAN. FIG. 15 illustrates example operations 1500 for wireless communications, in accordance with certain aspects of the presented disclosure. The operations 1500 may be performed, for example, by the RAN (e.g., a wireless node which may be a central unit 140). Operations 1500 may begin, at 1502, by determining cell types of one or more BSs, wherein the cell types comprise a first cell type that supports a first set of functions or a second cell type that supports a second set of functions, wherein the second set of functions is different than the first set of functions. At 1504, the RAN configures at least a first BS of the one or more BSs as the first cell type and at least a second BS of the one or more BSs as the second cell type.

Example NR Measurement and Reporting

According to certain aspects, the UE may receive measurement configuration information, for example, from a cell or from the network. The UE may be configured to measure ACell and/or DCells. Based on the measurement configuration, the UE may monitor/detect MRS from one or more BSs and report measurement results.

According to certain aspects, ACell cells may be detected by the UE autonomously or based on configuration by the RAN (e.g., CU or DU) for measurement reporting. For ACells, the PSS/SSS and PBCH may always be ON (e.g., always be transmitted with some configurable periodicity), thus, the UE can detect the ACells autonomously. MRS may be sent periodically from the ACells or "on-demand" (e.g., as triggered by the UE or RAN). The MRS from the ACells may be scrambled by the information given by PSS/SSS from the ACells. The MRS-ID may be explicitly indicated to the UE over the ACell.

According to certain aspects, DCells may be detected by the UE based on configuration by the RAN (e.g., CU, DU, or TRP) for measurement reporting. Timing may be based on the ACells (e.g., small timing window for non-collocated but synchronization with ACell is assumed). The MRS for the UE to measure the DCell may be always ON (e.g., sent periodically) or may sent on-demand, for example, as triggered by the RAN (e.g., during initial acquisition when the UE is measuring the DCell and/or during UE data transmission/reception to/from the DCell) or by the UE (e.g., during UE data transmission/reception to/from the DCell).

The DCell measurements may be based on one or more MRS (with or without PSS/SSS either explicitly identifying the MRS or explicitly identifying the cell associated with the MRS) from the DCell. The RAN may configure the UE to measure one or more MRS sent from the DCell (and/or ACell) with or without explicit MRS identifiers and the UE may report the results of the MRS accordingly.

The DCell measurements may be based on measured result(s) of ACell. The RAN may configure the UE to measure MRS sent from the ACell with or without explicit MRS identifiers and the UE may report the measured results of the ACell MRS. The RAN can estimate the signal quality between the UE and the DCell based on the ACell MRS measured results by taking into account some additional factors (e.g. path-loss difference between the ACell and DCell, geographical locations of the ACell and the DCell, etc.).

According to certain aspects, the UE may receive an explicit indication of specific MRS for the UE to measure. For example, the UE may receive a list of MRS-ID from the RAN and monitor for the MRS based on the list. Additionally or alternatively, the UE can blindly detect the MRS without receiving the MRS-ID from the RAN. For example, the DCell may send a synchronization signal carrying MRS-ID. The mapping of the MRS-ID to a sequence may be known, a priori, to both the RAN and UE.

According to certain aspects, the MRS detection may be RAN-assisted. For example, the UE may receive assistance information from a node via upper layer signaling and monitor for the MRS based on the assistance information. The assistance information may include a timing offset between the ACell and the DCell, an identifier of the cell, an identifier of one or more measurement reference signals, or a sequence of the one or more measurement reference signals. Alternatively, the MRS detection may be without RAN-assistance. For example, the UE may receive information from a BS. The information may include timing references, an identifier of the cell, or identifiers of the one or more measurement reference signals. The UE may blindly detect the MRS based on the information. The identifier of the cell may be received via a synchronization signal and may be provided per measurement reference signal or per cell.

According to certain aspects, the UE may send a measurement report (e.g., via RRC signaling) based on MRS measurements of the cells. For example, the UE may send an RRC Measurement Report. Each element in the RRC Measurement Report may include a Physical Measurement ID (PMeasID), a measured reference signal received power (RSRP) value of the MRS, and/or a reference signal received quality (RSRQ) value of the MRS. In aspects, a different measurement report may be used for the ACell than for the DCell. For example, for ACells, the PMeasID may include the cell ID (e.g., PCI signaled by PSS/SSS); whereas, for DCells, the PMeasID may include the virtual cell ID (e.g., virtual PCI signaled by the DCells PSS/SSS or configured by RAN over the ACell).

According to certain aspects, the UE may reorder the measurement results of the one or more measurement reference signals per the single cell type based on the configuration information.

According to certain aspects, measurement may be proxy based. For example, the RAN may receive one or more measurement reports from the UE including measurement results associated with a first cell of the first type (e.g., ACell) and may determine quality of a second cell of the second type based (e.g., DCell) on the one or more measurement results associated with the first cell. The determination of the quality of the second cell may be based on a pathloss between the first cell and the second cell and/or geographical locations of the first cell and the second cell.

Example NR Cell Selection/Reselection/Handover

An RRC inactive state (e.g., which may be referred as "RRC_INACTIVE") may refer to a RAN controlled state of the UE. In the RAN controlled state, the UE may incur only minimum signaling, minimize power consumption, and minimize resource costs in the RAN/CN in order to maximize a number of UEs that can operate in this state. UEs in the RAN controlled state may start data transfer with small delay. In some cases, the UE may leave the RAN controlled state for data transfer, in other cases the data transfer may occur while the UE is in the RAN controlled state.

According to certain aspects, UEs that are idle mode (e.g., RRC inactive state) may perform cell selection/reselection, based on measurements of the synchronization signals, PBCH, and/or MRS transmitted by ACells, but do not perform cell selection/reselection of DCells. For example, the idle mode UEs may be able to differentiate between ACells and DCells and determine whether the cell is suitable for selection based on the cell type. According to certain aspects, the DCells may be used only for carrier aggregation or dual-connectivity.

According to certain aspects, when the ACell for the UE changes, the beam/cell mobility may be RRC driven at the cell level. When the DCell for the UE changes, the beam/cell mobility may be a MAC/PHY level with little or no RRC involvement.

Similarly, UEs in the in connected state may select ACells for handover, based on synchronization signals, PBCH, and/or MRS measurements, but may not consider (e.g., may ignore) the DCells for handover.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    receiving one or more downlink signals from a first cell
        explicitly indicating the first cell is of a data only cell type that does not support system access functionality, reselection functionality, handover functionality, and functionality including transmission of a measurement reference signal (MRS) and that supports at least one of: carrier aggregation (CA) functionality, dual connectivity (DC) functionality, or multi-connectivity functionality;

receiving one or more downlink signals from a second cell indicating the second cell is of an access cell type that supports system access functionality, reselection functionality, handover functionality, and functionality including transmission of MRS;

receiving configuration information indicating one or more cell types for the UE to perform measurement reporting, wherein the configuration information comprises:
 an indication for the UE to perform measurement reporting for the access cell type; and
 a list of identifiers of one or more MRSs; based on the configuration information and the indication that the second cell type is of the access cell type:
 monitoring for one or more MRSs based on the list of identifiers;
 measuring one or more of the monitored MRSs from the second cell of the access cell type; and
 transmitting one or more measurement reports indicating one or more measurement results of the one or more measured MRSs;

estimating a signal quality between the UE and the first cell of the data only cell type based on the one or more measurement results of the one or more measured MRSs from the second cell of the access cell type; and communicating with the first cell based on the indication that the first cell is of the data only cell type and with the second cell based on the indication that the second cell is of the access cell type.

2. The method of claim 1, wherein the one or more downlink signals comprises a physical broadcast channel (PBCH).

3. The method of claim 1, wherein the access cell type supports functionality including transmission of a primary synchronization signal (PSS), a secondary synchronization signal (SSS), a physical broadcast channel (PBCH), MRS, and system information.

4. The method of claim 3, wherein the communicating comprises:
 including the second cell for at least one of: cell selection or handover; and
 ignoring the first cell for at least one of: cell selection or handover.

5. The method of claim 3, wherein the communicating with the first cell comprises selecting the first cell as a secondary cell for at least one of: CA, DC, or multi-connectivity based on the indication that the first cell is of the data only cell type.

6. The method of claim 1, wherein the one or more downlink signals indicate at least one of: an identifier, a physical cell ID (PCI), or a virtual identifier.

7. The method of claim 1, further comprising blindly detecting at least one of the one or more MRSs from the second cell.

8. The method of claim 1, further comprising:
 receiving assistance information from a wireless node via upper layer signaling; and monitoring for the one or more MRSs based on the assistance information.

9. The method of claim 1, further comprising determining one or more identifiers of the one or more MRSs based on a mapping of sequences of the one or more MRSs to the one or more identifiers.

10. The method of claim 1, wherein the one or more MRSs are sent by the second cell on-demand, in response to a request from the UE for MRS transmission.

11. A method for wireless communication by a base station (BS), comprising:
 identifying a first cell as a data only cell type that does not support system access functionality, reselection functionality, handover functionality, and functionality including transmission of a measurement reference signal (MRS) and that supports at least one of: carrier aggregation (CA) functionality, dual connectivity (DC) functionality, or multi-connectivity functionality;
 transmitting one or more downlink signals explicitly indicating the first cell is of the data only cell type to a user equipment (UE);
 transmitting one or more downlink signals indicating a second cell is of an access cell type that supports system access functionality, reselection functionality, handover functionality, and functionality including transmission of MRS;
 transmitting configuration information indicating one or more cell types for the UE to perform measurement reporting, wherein the configuration information comprises:
  an indication for the UE to perform measurement reporting for the access cell type; and
  a list of identifiers of one or more MRSs; and based on the configuration information and the indication that the second cell type is of the access cell type:
  transmitting the one or more MRSs via the second cell of the access cell type; and
  receiving one or more measurement reports indicating one or more measurement results of the one or more MRSs.

12. The method of claim 11, wherein the explicit indication is transmitted in a physical broadcast channel (PBCH).

13. The method of claim 11, wherein the access cell type supports functionality including transmission of a primary synchronization signal (PSS), a secondary synchronization signal (SSS), a physical broadcast channel (PBCH), MRS, and system information.

14. The method of claim 13, wherein a periodicity of at least one of: the PSS, the SSS, the PBCH, or the system information is based on at least one of: configuration information received from a network or the cell type.

15. A method for wireless communication by a wireless node, comprising:
 determining cell types of one or more cells of one or more base stations (BSs), wherein determining the cell types includes:
  determining a first cell is of an access cell type that supports system access functionality, handover functionality, and reselection functionality; and
  determining a second cell is of a data only cell type that does not support system access functionality, reselection functionality, handover functionality, and functionality including transmission of a measurement reference signal (MRS) and that supports at least one of: carrier aggregation (CA) functionality, dual connectivity (DC) functionality, or multi-connectivity functionality; and
 configuring at least the first cell as the access cell type and at least the second cell as the data only cell type.

16. The method of claim 15, wherein:
the access cell type further supports functionality including transmission of at least one of: a primary synchronization signal (PSS), a secondary synchronization signal (SSS), a physical broadcast channel (PBCH), a MRS, and system information.

17. The method of claim 15, further comprising configuring one or more user equipments (UEs) with a UE-specific reference signal.

18. The method of claim 17, further comprising receiving one or more measurement reports from the one or more UEs based on the UE-specific reference signals.

19. The method of claim 18, further comprising making a mobility decision based on the one or more measurement reports and the configured cell types configuring of the first cell as the access cell type and the second cell as the data only cell type.

20. The method of claim 15, further comprising making a carrier aggregation configuration decision based on the configuring of the first cell as the access cell type and the second cell as the data only cell type.

21. The method of claim 15, further comprising making a multi-connectivity configuration decision based on the configuring of the first cell as the access cell type and the second cell as the data only cell type.

22. An apparatus for wireless communication by a user equipment (UE), comprising:
means for receiving one or more downlink signals from a first cell explicitly indicating the first cell is of a data only cell type that does not support system access functionality, reselection functionality, handover functionality, and functionality including transmission of a measurement reference signal (MRS) and that supports at least one of: carrier aggregation (CA) functionality, dual connectivity (DC) functionality, or multi-connectivity functionality;
means for receiving one or more downlink signals from a second cell indicating the second cell is of an access cell type that supports system access functionality, reselection functionality, handover functionality, and functionality including transmission of MRS;
means for receiving configuration information indicating one or more cell types for the UE to perform measurement reporting, wherein the configuration information comprises:
an indication for the UE to perform measurement reporting for the access cell type; and
a list of identifiers of one or more MRSs; means for, based on the configuration information and the indication that the second cell type is of the access cell type:
monitoring for one or more MRSs based on the list of identifiers;
measuring one or more of the monitored MRSs from the second cell of the access cell type; and
transmitting one or more measurement reports indicating one or more measurement results of the one or more measured MRSs;
means for estimating a signal quality between the UE and the first cell of the data only cell type based on the one or more measurement results of the one or more measured MRSs from the second cell of the access cell type; and
means for communicating with the first cell based on the indication that the first cell is of the data only cell type and with the second cell based on the indication that the second cell is of the access cell type.

\* \* \* \* \*